United States Patent [19]

Keem et al.

[11] Patent Number: 4,698,833
[45] Date of Patent: Oct. 6, 1987

[54] SUBASSEMBLY, METHOD AND SYSTEM FOR MONOCHROMATIZING X-RAYS

[75] Inventors: John E. Keem, Bloomfield Hills; Gerald F. Marshall, Grosse Pointe Woods, both of Mich.

[73] Assignee: Energy Conversion Devices, Inc., Troy, Mich.

[21] Appl. No.: 733,893

[22] Filed: May 14, 1985

[51] Int. Cl.$^4$ ............................................ G01N 23/22
[52] U.S. Cl. ..................................... 378/84; 378/83
[58] Field of Search .................................. 378/84, 85

[56] References Cited

U.S. PATENT DOCUMENTS

| 2,688,094 | 8/1954 | Dumond | 378/85 |
| 4,256,961 | 3/1981 | Shoji et al. | 378/85 |
| 4,472,825 | 9/1984 | Jenkins | 378/85 |
| 4,513,434 | 4/1985 | Dunn | 378/85 |
| 4,525,853 | 6/1985 | Keem et al. | 378/84 |

Primary Examiner—Janice A. Howell
Assistant Examiner—David P. Porta
Attorney, Agent, or Firm—Richard M. Goldman; Marvin S. Siskind

[57] ABSTRACT

An improved X-ray monochromatizing subassembly, method and system are provided by a plurality of X-ray dispersive structures which are spaced and aligned to intercept X-rays and reflect monochromatized X-rays from the intercepted X-rays. The system includes a source of X-rays and an X-ray detector for detecting the monochromatized reflected X-rays. The monochromatized X-rays can be designed to be diverging, parallel or converging and can be designed for a particular wavelength of interest.

26 Claims, 10 Drawing Figures

SUBASSEMBLY, METHOD AND SYSTEM FOR MONOCHROMATIZING X-RAYS

BACKGROUND OF THE INVENTION

This invention relates to an improved subassembly, method and system for monochromatizing X-rays.

Commercial X-ray dispersive structures are formed from crystalline structures such as LiF, metal acid phthalates (map), pyrolytic graphite and Langmuir-Blodgett (LB) films. These materials have very restrictive lattice spacing constraints. In addition, the LB and map devices have severe environmental limitations and must be operated near room temperature in a dry environment. LB devices are not appropriate for very high vacuum applications since under certain conditions they can evolve contaminants. They are also inappropriate for high incident beam energy applications since they can decompose. They have poor mechanical integrity, such as scratch resistance, mechanical breaking strength and resistance to abrasion. Further, all of the prior structures have lower reflectivities than desired.

Numerous attempts to construct both natural and new crystalline analogue materials have been made with the aim of extending the X-ray properties heretofore limited by the availability of natural crystalline materials. One such attempt is compositional modulation by molecular beam epitaxy (MBE) deposition on single crystal substrates. For example, in Dingle et al., U.S. Pat. No. 4,261,771, the fabrication of monolayer semiconductors by one MBE technique is described. These modulated prior art structures are typically called "superlattices." Superlattices are developed on the concept of layers of materials forming homo or hetero epitaxially grown planes or film layers resulting in a one-dimensional periodic potential. Typically, the largest period in these superlattices is on the order of a few hundred Angstroms; however, monatomic layered structures have also been constructed.

The superlattices can be characterized by the format of a number of layer pairs formed by a layer of A (such as GaAs) followed by a layer of B (such as AlAs), etc.; formed on a single crystal synthetic material with good crystalline qualtiy and long range order. The thickness of each layer pair (A and B) is defined as the "d" spacing. These structures are not appropriate for most reflective or dispersive structures due to the small electron density contrast between the layers. These structures being essentially single crystals with extra superlattice periodicities also suffer from restrictive d spacing, associated with the constraint that the entire structure be a single crystal.

In addition to the MBE type of superlattices construction techniques, other researchers have developed layered synthetic microstructures (lsm) utilizing other forms of vapor deposition, including diode and magnetron sputtering, reactive gas injection and standard multisource evaporation. The layer dimensions are controlled by shutters or moving the substrates relative to the material sources or with combinations of shutters and relative motion. In the case of multisource evaporation, the required thickness control is achieved by monitoring the X-ray reflectivity of the film in situ as the deposition is being made. The materials reported have been formed from crystalline layers, noncrystalline layers and mixtures thereof; however, generally the efforts so far reported are directed at the synthesis of superlattice-type structures by precisely reproducing the deposition conditions on a periodic reoccurring basis. Some of the structures have graded d spacing through the structure.

These materials can be thought of as synthetic crystals or crystal analogues in which it is defined as crucial that the long range periodicity of repetition of a particular combination of layers be maintained. These structures are both structurally and chemically homogeneous in the x-y plane, and are periodic in the third (z) direction. These construction approaches particularly sputtering, can utilize a greater variety of materials than evaporation. The d spacing in a structure can be graded throughout the structure to provide some reflectivity for a range of X-range wavelengths, but they do not achieve optimum control of higher order reflections and the deposition precision is not as good as desired. This results in interfaces and layer thicknesses which are not as precise as desired for certain applications. While smoothing of the underlying substrate or layers has been reported as multiple layers are deposited, the minimum smoothness reported has been about 1.4 to 1.8 Å. Also, the minimum reported d spacing for any significant reflectivity has been above 15 Å. One desired goal in producing high efficiency X-ray reflectors is to produce a maximum contrast in electron density across the most precisely defined interface which produces the greatest number of orders of reflection. Further, the smoothness of the layer surfaces must be as precise as possible to minimize scattering caused by the surface variations.

Improved X-ray dispersive structures and methods of making them are described in copending applications Ser. No. 501,659, filed June 6, 1983, entitled "Improved X-ray Dispersive and Reflective Structures And Method of Making The Structures" in the names of John E. Keem, Stanford R. Ovshinsky, Steven A. Flessa, James L. Wood, Keith L. Hart and Lennard Sztaba; Ser. No. 547,338, filed Oct. 31, 1983, entitled "Improved Reflectivity And Resolution X-ray Dispersive And Reflective Structures And Method Of Making The Structures" in the names of John E. Keem, Stanford R. Ovshinsky, Steven A. Flessa, James L. Wood, Keith L. Hart and Lennard Sztaba and Ser. No. 542,886, filed Oct. 17, 1983, entitled "Point Source X-ray Focusing Device" in the names of John E. Keem and Gerald F. Marshall.

Monochromators are designed to select a substanially single wavelength from a polychromatic beam. Prior X-ray monochromators are generally of two types. The first type includes a pair of filters through which the X-ray beam is passed. The first dual filter type monochromator is directed toward maximizing the integrated flux of interest while filtering the unwanted flux from the X-ray beam. The filtering substantially reduces the unwanted flux, but does not eliminate it; however, to a lesser extent it also reduces the flux of interest. The second type is a single or double crystal type device in which the X-ray beam is reflected off a first crystal (single or double type) and then off a second parallel crystal (double type). The second type of monochromator provides good filtration of the unwanted flux, but have a small bandwidth (frequently less than one percent) and a relatively small solid angle of collected X-ray flux of interest. This limitation in solid angle of flux collection results in severely reduced total collected flux and the small bandwidth is unnecessarily narrow for some applications.

SUMMARY OF THE INVENTION

The disadvantages of the prior art are overcome by an improved subassembly, method and system for monochromatizing X-rays. The monochromatizing subassembly includes a plurality of X-ray dispersive structures which are aligned relative to and spaced from one another to intercept X-rays from an X-ray source. The dispersive structures have at least one surface with a plurality of X-ray dispersive layers formed thereon to monochromatize and reflect the X-rays intercepted by the structures.

The method and system include providing a source of X-rays and intercepting the X-rays with the monochromatizing subassembly and detecting the reflected monochromatized X-rays. The reflected X-rays can be converging, diverging or substantially parallel. The dispersive structures can include an X-ray absorbing portion to avoid direct X-ray impingement from the source onto the detector. The method and system can include rotation of the subassembly about a first center of rotation to overcome a non-uniform irradiance pattern of the reflected X-rays on the detector plane. The subassembly can be rotated about a second center of rotation to obtain an enhanced contrast of the image irradiance pattern.

DESCRIPTION OF THE PREFERRED EMBODIMENTS

Figure 1:
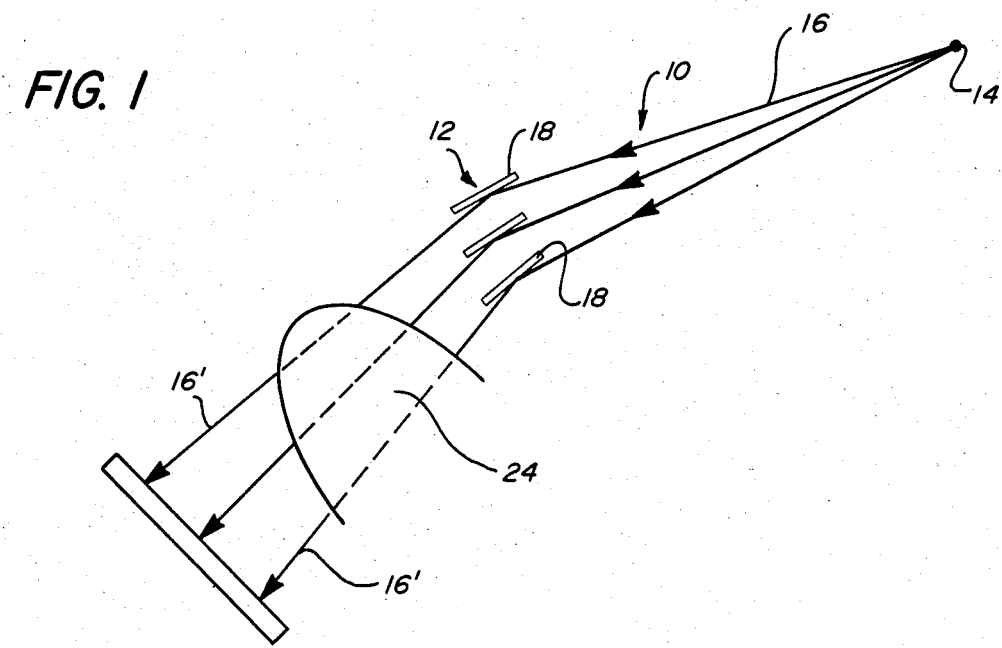
FIG. 1 is a diagrammatic representation of one embodiment of an improved monochromatizing X-ray system including the monochromatizing X-ray subassembly of the invention.

FIG. 1 illustrates one embodiment of an improved system 10 for monochromatizing X-rays utilizing a monochromatizing subassembly 12 of the invention. An X-ray source, such as a point source 14, provides a plurality of X-rays 16. The X-rays 16 are intersected by a plurality of X-ray dispersive structures 18 of the subassembly 12. The structures 18 can be a generally planar or curved substrate 20 (FIG. 2) and include a plurality of layer sets 22 formed thereon. Each of the layer sets 22 include at least two layers with each layer having different electron densities. The sets can include more than two layers which form a particular electron density profile. The sets can be identical throughout the structures or can be varied for specific performance characteristics.

The system of the invention can provide a decreased bandwidth over the prior dual filter monochromator for the same application. The system of the invention also can provide a collected flux one hundred times greater than the prior second type of single or double crystal monochromator with ten times better bandwidth for the same application.

Figure 2:
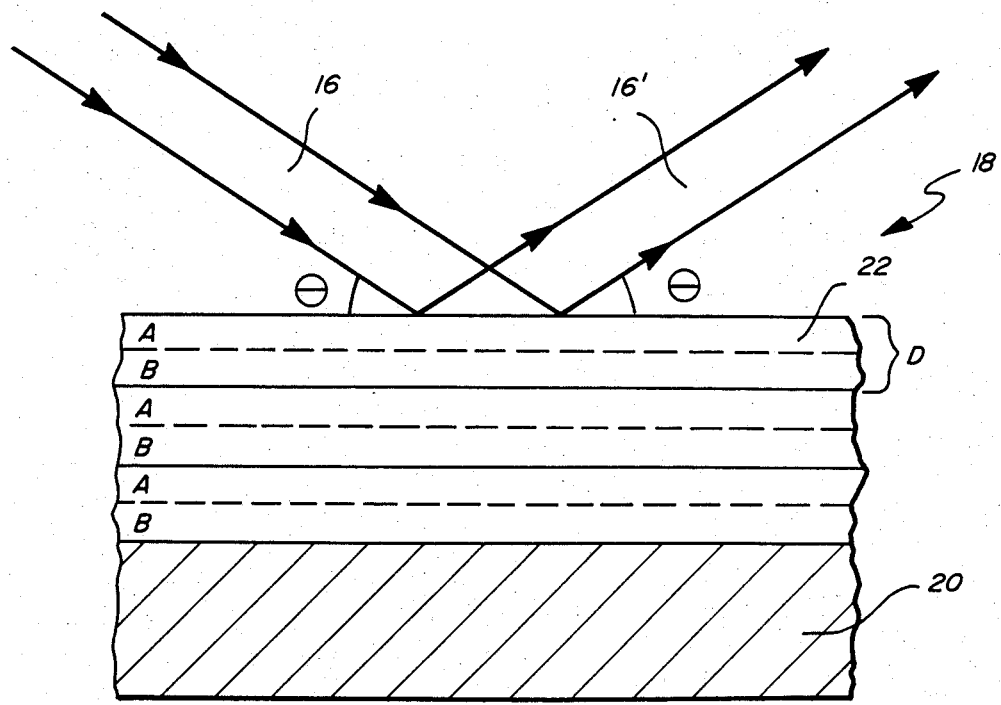
FIG. 2 is an exploded partial sectional view of one X-ray dispersive structure of the subassembly of the invention.

FIG. 2 shows the dispersion pattern produced by the layer sets 22, illustrated as layer pairs, of the dispersive structure 18. This can be viewed as an incident beam 16 reflected at an angle $\theta$ as a reflected beam 16'. While only three layer sets or pairs have been shown, having a layer spacing d, typically many layer pairs are utilized for example on the order of 100-2000. The incident beam 16 is made up of a band of wavelengths, $\lambda$ being an example of one wavelength. The reflected beam 16' is made up of a substantially single wavelength $\lambda'$ reflected at angel $\theta$, approximately according to Bragg's law $n\lambda' = 2d \sin\theta$. This condition is also satisfied for all subharmonics of $\lambda'$, i.e. $\lambda'/2, \lambda'/3 \ldots \lambda'/n$. Therefore, the reflected beam 16' contains all of these of these wavelengths in proportions to both their intensity, i.e. spectral radiance, in the incident beam and the magnitude of the higher orders of reflection which result from the rectangular electron density distribution, as illustrated in FIG. 2. $I_i(\lambda)$ is the incident intensity distribution of $\lambda$ and $I_r(\lambda')$ is the reflected intensity distribution of $\lambda'$. Intensity I can be called irradiance E, which is a measure of the radiant power per unit area. (A full theoretical treatment results in a modification of Bragg's law resulting from refraction of the X-ray beam.)

The layer sets or pairs preferably are formed from metal (M) and non-metal (non-M) alternating layers. The M layer preferably is formed from a heavy element such as W, Mo or Nb or alloy thereof while the non-M layer is formed from a lighter element such as Si, C or $B_4C$ or allow thereof. The wavelength of interest for soft tissue shadowgrams is in the range of about 0.24 to 0.83 Å, which requires a d spacing of about 10-20 Å. Other applications utilize different wavelengths and in general the subassembly is more effective for longer wavelengths. The layered structure should have no absorption edge at the wavelength of interest and should provide a minimum of diffuse scattering and fluorescence.

Each layer pair contributes to the irradiance of the reflected beam at the same angle of reflection. The reflection from only one layer pair is illustrated. The structure 18 is formed from a plurality of sets of layers, each layer of which includes a pair of different material layers, such as A and B, which is intended to have abrupt junction between each layer set. Functionally, this means there essentially is a square wave electron density or equivalently a refractive index profile caused by the plurality of layer sets on the substrate which intercepts the beam 16. A complete detailed explanation of the materials utilized and the methods of making the dispersive structures 18 are disclosed in patent applications Ser. No. 501,659, Ser. No. 547,338, and Ser. No. 542,886 (now allowed) which are incorporated herein by reference.

The reflected and monochromatized X-rays 16' are directed through an object to be analyzed, such as a breast 24 (shown in phantom). The X-rays 16' are then received by a detector 26, such as a photographic X-ray plate. The detected X-rays contain the information necessary to analyze the breast 24 or other object of interest.

Figure 3:
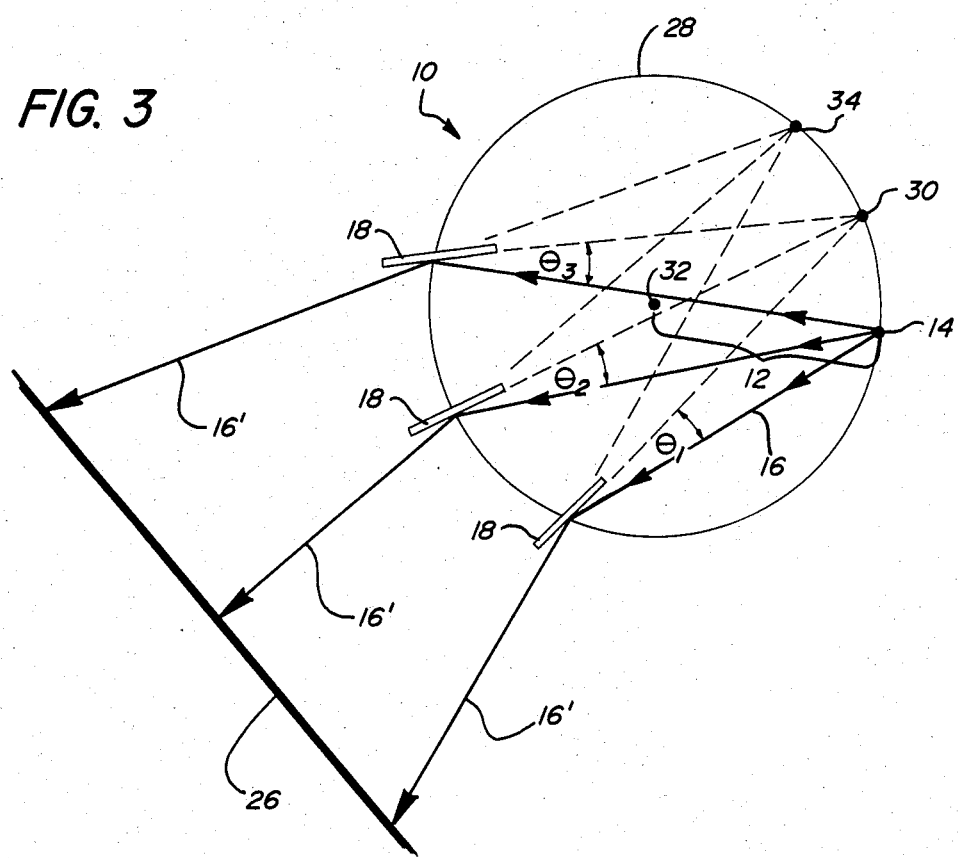
FIG. 3 is a diagrammatic representation of a diverging monochromatizing X-ray subassembly embodiment of the invention.

A more detailed exploded view of the diverging system 10 and the subassembly 12 is illustrated in FIG. 3. Each of the X-ray beams 16 intersect the layers of a respective dispersive structure 18 at Bragg's angle $\theta_1 = \theta_2 = \theta_3$. The diverging system 10 is a preferable system for ease of manufacture and assembly, because each of the structures and layer sets thereon are substantially identical. The optical center of each dispersive structure 18 lies on the circumference of a circle 28 of radius R. The tangent plane at the optical center of each structure intersected by the X-rays lies on the circle 28 at a center of rotation 30. The circle 28 has a center 32. The reflected X-rays 16' have a virtual source 34, also on the circle 28. Although only three structures 18 are illustrated, the subassembly 12 can include a large number of structures (100 to 200 depending upon the wavelength range of interest). The number of structures 18 is determined both by the wavelength of interest and the size (format) of the detector 26. For longer wavelengths to achieve the same profile on the same size detector, the number of plates is fewer. Longer wavelengths increase the solid angle and generally increase the reflectivity of the structures. The structures 18 can be spaced apart from a lower limit determined by the angle of total internal reflection to an upper limit essentially determined only by wavelength. The structure spacing is also determined by the length w of the structures as shown by formula (9). The spacing will be about 0.5 mm for a wavelength of 0.38 Å, with a structure length w if 50 mm. The wavelength 0.38 Å is a wavelength of interest in the soft tissue or mammography range of 0.24 to 0.83 Å.

While the structures are illustrated as generally planar, they also can be slightly curved. The curved structures can be utilized to provide a reflected converging X-ray beam and to increase the collected solid angle of the incident X-rays.

Figure 4:
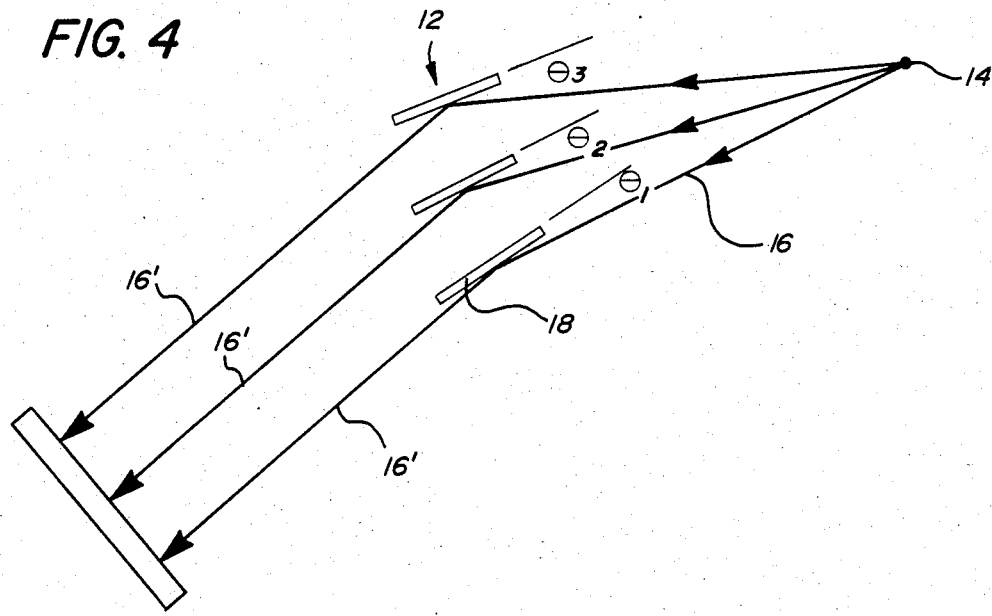
FIG. 4 is an exploded partial sectional view of one X-ray parallel structure of the subassembly of the invention.

Referring to FIG. 4, a second parallel beam embodiment 34 of the system of the invention is illustrated. The reflected X-rays 16' are substantially parallel to one another. In the system 34, each of the angles $\theta_1$, $\theta_2$ and $\theta_3$ will be different as will each of the X-ray dispersive properties of the respective structures 18 to ensure that the peak reflected wavelength for each structure is the same.

Figure 5:
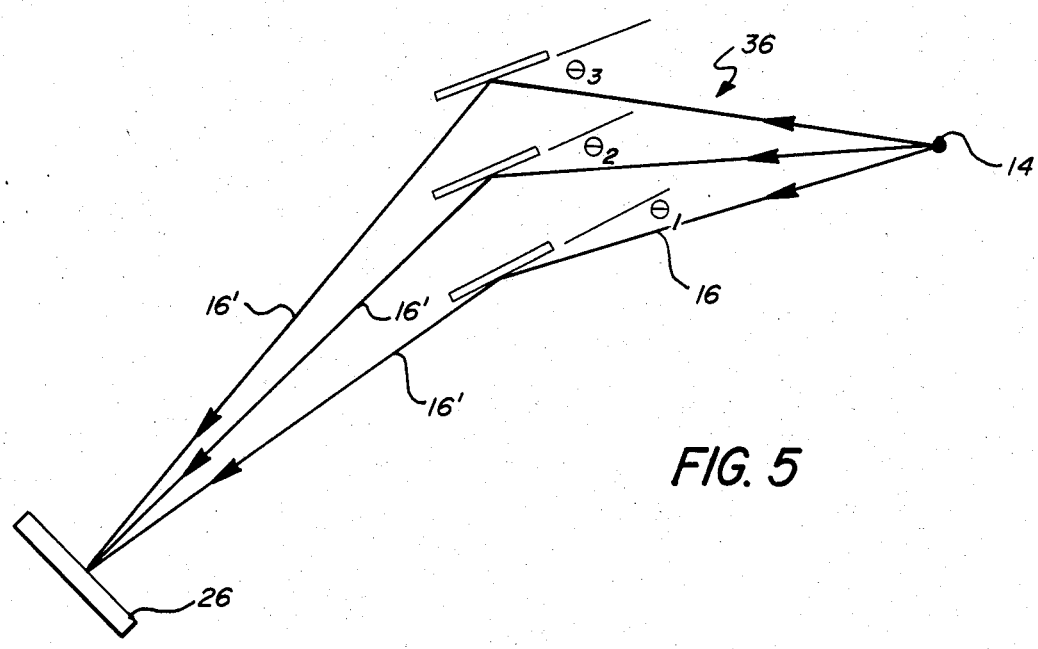
FIG. 5 is an exploded partial sectional view of one X-ray converging structure of the subassembly of the invention.

A third converging beam embodiment 36 is illustrated in FIG. 5. The reflected beams 16' converge substantially to a point on the detector 26 in this system. Again, $\theta_1$, $\theta_2$ and $\theta_3$ are not equal and each of the X-ray dispersive properties of the structures 18 will also be different again to ensure that the peak reflected wavelength for each structure is the same. The solid angle collected per unit area will be increased by the system 36 which concentrates irradiance.

Figure 6:
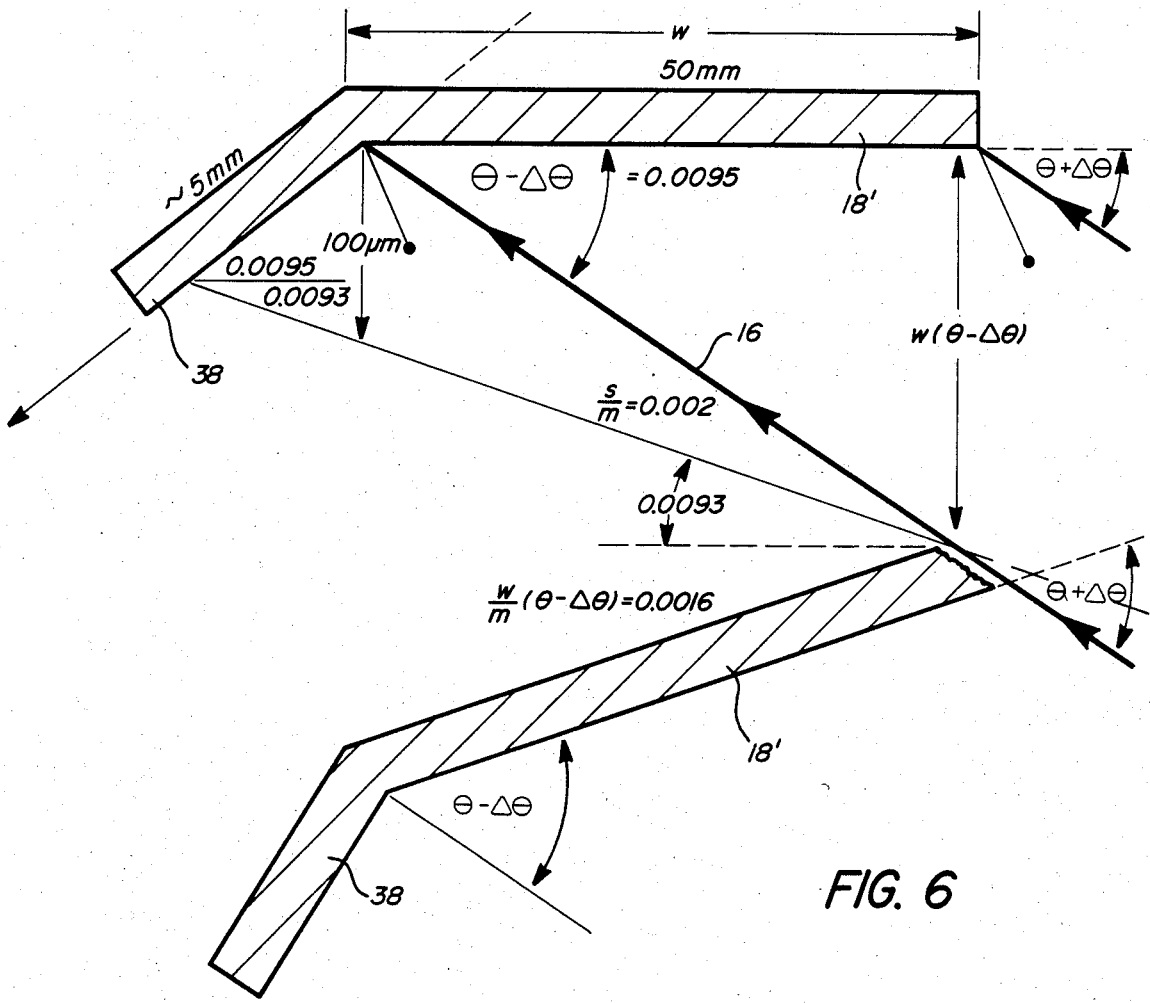
FIG. 6 is a side view of one embodiment of the dispersive structure of the invention.

Referring to FIG. 6, a pair of dispersive structures 18' are illustrated which include an X-ray absorbing portion 38 on one end of the structures 18'. The portions 38 are designed and aligned to prevent any direct impingement by the unreflected source rays 16 onto the length w of the detector 26. The length of the portions 38 is on the order of ten percent of the structures 18.

Figure 7:
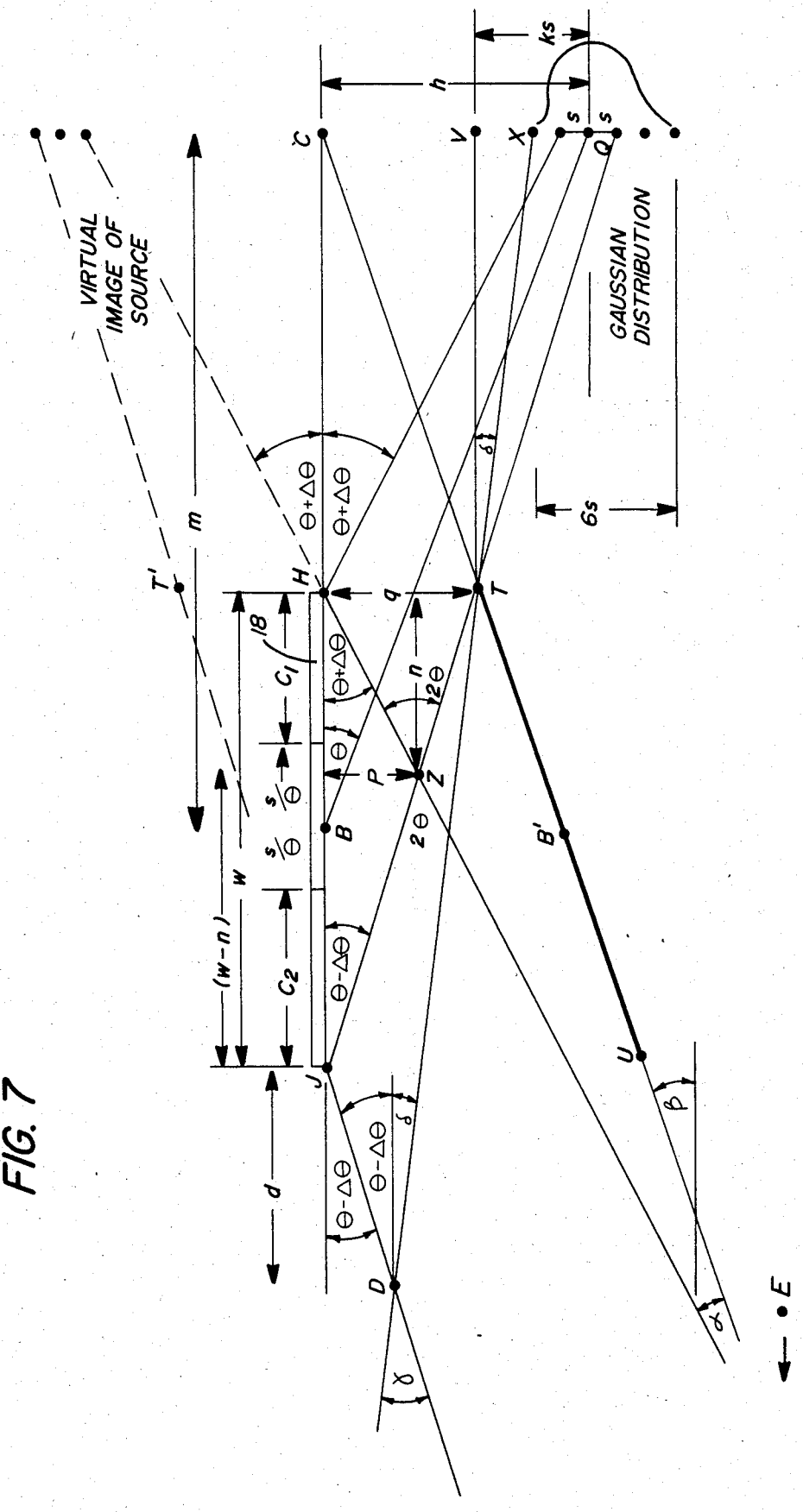
FIG. 7 is a diagrammatic representation of the calculations necessary to design the structure of FIG. 6.

FIG. 7 illustrates the design citeria for the structures 18'. As illustrated, $$h = m\theta = (m - s/\theta - C_1)(\theta + \Delta\theta) + s \qquad (1)$$

In the equation $\Delta\theta$ is the semi bandwidth, the source size is assumed to have a Gaussian distribution with the standard deviation being s; m is the diameter of the circle 28; h is the source to center 30 distance. Solving for the structure length w, f can be designated the semi fractional bandwidth, $f = \Delta\theta/\theta$ so that $(\theta + \Delta\theta) = \theta(1+f)$ $$w = 2s/\theta + C_1 + C_2 \qquad (2)$$

Solving for $C_1$ and $C_2$ from equation (1) and substituting then in equation (2) results in the structure length:

$$w = 2\left[\frac{mf + s/\theta}{1 - f^2}\right] \qquad (3)$$

The structure spacing q can be determined from $q = 2\theta n$ where:

$$n = \frac{(1 - f)}{(2)} w \qquad (4)$$

Substituting w from (3) in (4) results in $$n = \frac{mf + s/\theta}{(1 + f)} \qquad (5)$$

Then solving for q:

$$q = 2\theta\left[\frac{mf + s/\theta}{1 + f}\right] \qquad (6)$$

The position D can be determined from the length d, which is unrelated to the d spacing.

In the triangle TJT' $2q = w2(\theta - \Delta\theta)$ (7)

In the triangle TDT' $2q = (w + d)[(\theta - \Delta\theta) + \delta]$ (8)

Equating the formulas (7) and (8) results in:

$$d = w\left[\frac{(1 - f) - \delta/\theta}{(1 - f) + \delta/\theta}\right]$$

Solving for $$\delta = \frac{VX}{HC} = \frac{(-q + h - ks)}{(m - s/\theta - C_1)}$$

and substituting in (9) leads to $$\frac{d}{w + d} = \frac{(1 + f)(k + 1)}{2(1 - f)(m\theta/s - 1)} \qquad (10)$$

Because of the very small distance d and angle $\delta$ the extension 38 most conveniently is made as an end portion of the structure 18.

Figure 8:
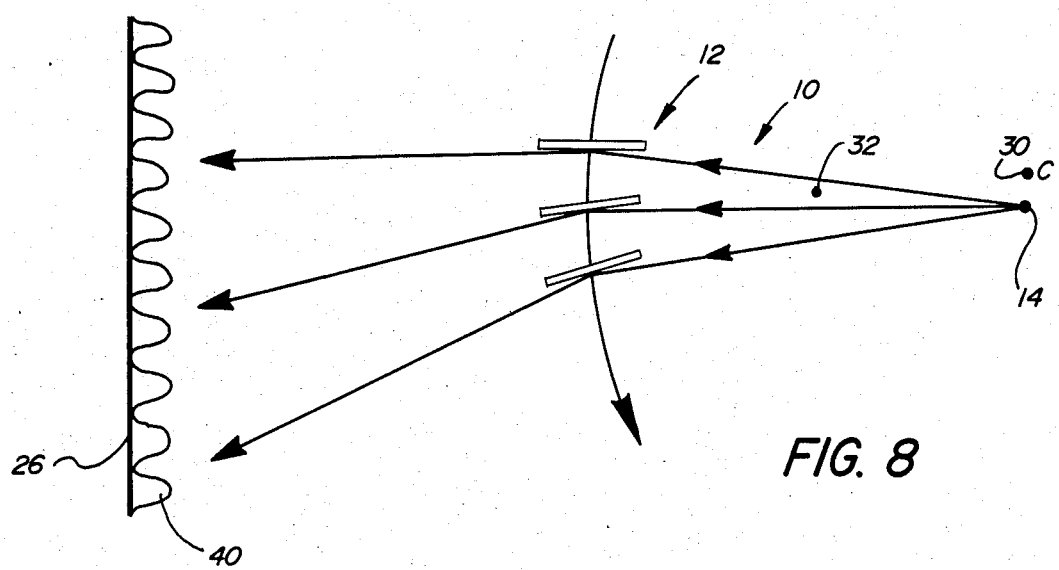
FIG. 8 is a diagrammatic representation of one embodiment of the invention for a method and system for providing uniform irradience of the monochromatized X-rays.

FIG. 8 illustrates a method for improving the irradiance distribution uniformity of the system 10. The detected X-rays 16' produce a periodic detection pattern 40 which is due to the structures 18 and the reflection of the X-rays from the layer pairs 22 of the structures 18. By rotating the subassembly 12 a small angle about the center of rotation 30, the reflected X-rays 16' will sweep the detector 26 to make the resulting average irradiance distribution more uniform.

Figure 9:
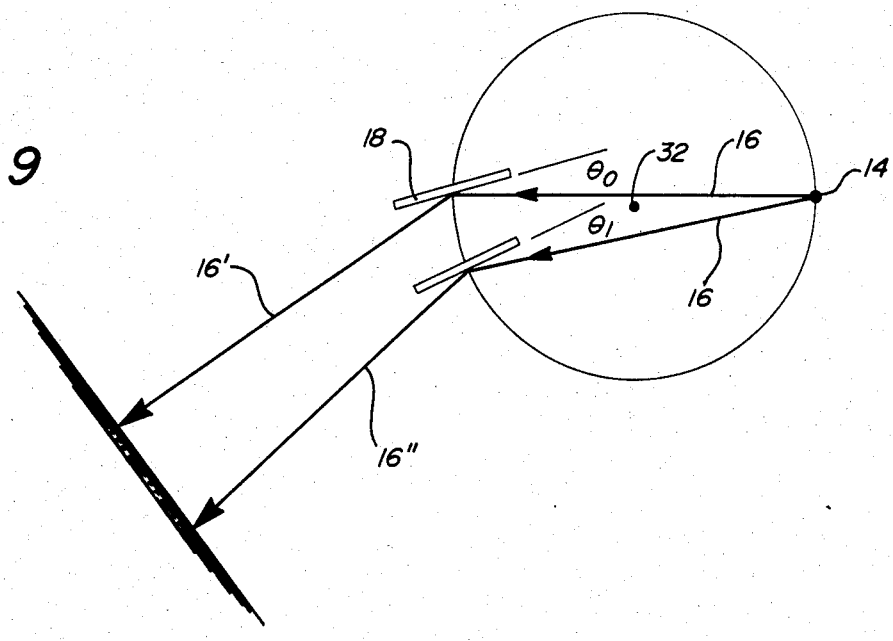
FIG. 9 is a diagrammatic representation of one embodiment of the invention for a method and system for enhancing contrast of the detected image.

Only a single structure 18 is illustrated in FIG. 9. The first position at angle $\theta_0$ reflects a first wavelength 16' ($\lambda_0$) which results in an intensity measurement of $I(\lambda_0)$ at the detector 26. The structure 18 is then rotated to a second angle $\theta_1$ which results in a second wavelength 16'' ($\lambda_1$) which results in an intensity measurement of $I(\lambda_1)$ at the detector 26. The two measurements are then subtracted from one another $I(\lambda_0) - I(\lambda_1)$ resulting in an enhancement in the detected image contrast. The angle of rotation typically is about ten percent of $\theta_0$.

Figure 10:
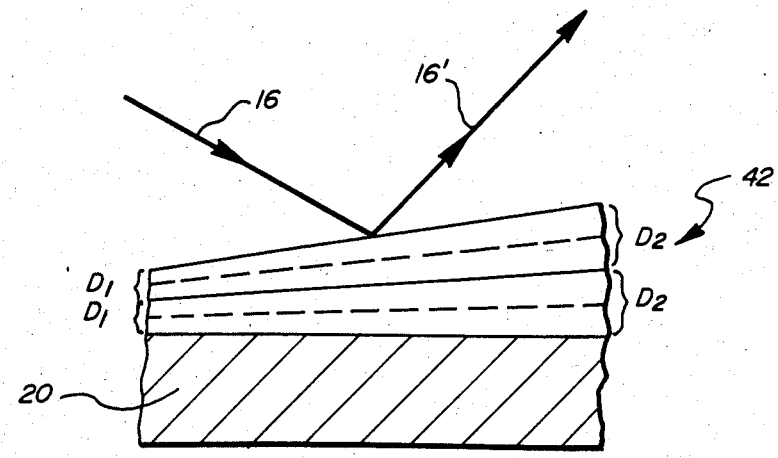
FIG. 10 is a side view of one graded X-ray dispersive structure of the subassembly of the invention.

The dispersive structure in any of the systems 10 can also be graded X-ray dispersive structure 42 as illustrated in FIG. 10 to increase the flux collected by the system 10 and thereby to increase resolution. The d spacing increases in the layers to the end of the structure which is fartherest from the source, i.e. $d_1$ is less than $d_2$. Increasing the d spacing also results in a structure 42 which can be longer and which then can increase the collected flux of the system 10. The d spacing can be increased in a linear or non-linear (not illustrated) manner in each layer set. The grading can be uniform or can vary throughout the structures.

Modification and variations of the present invention are possible in light of the above teachings. It is therefore to be understood that within the scope of the appended claims, the invention may be practiced otherwise than as specifically described.

What is claimed and desired to be secured by Letters Patent of the United States is:

1. A parallel beam X-ray monochromatizer subassembly (34 of FIG. 4) comprising a plurality of individual X-ray dispersive structures (18), the individual X-ray dispersive structures (18) having at least one surface with a plurality of layer sets (22) formed thereon, the layer sets (22) on each of the X-ray dispersive structures (18) being different and having substantially different X-ray dispersive properties, the individual X-ray dispersive structures (18) being arrayed about a circle (28) with the optical center of each individual X-ray dispersive structure (18) being on the circumference of the circle (28) and adapted for use with an X-ray point source (14) so that the tangent plane of X-rays (16) from the point source (14) at the optical center of each individual X-ray dispersive structure (18) lies on the circle (28) at a center of rotation (30), such that each structure (18) intersects the X-rays (16) at substantially different angles (theta-1, theta-2, theta-3) so as to reflect parallel, reflected, monochromatized X-rays (16').

2. The subassembly as defined in claim 1 wherein said dispersive structures are substantially planar.

3. The subassembly as defined in claim 1 wherein said dispersive structures are substantially curved.

4. The subassembly as defined in claim 1 wherein said layer sets have a substantially equal fixed d spacing.

5. The subassembly as defined in claim 1 wherein said layer sets are formed to have a graded d spacing to increase the collected flux.

6. The subassembly as defined in claim 5 wherein said layers sets have a substantially equal fixed d spacing.

7. The subassembly as defined in claim 1 wherein said dispersive structures are substantially planar.

8. The subassembly as defined in claim 1 wherein said dispersive structures are substantially curved.

9. The subassembly as defined in claim 1 wherein said layer sets are different on each of said structures and have different X-ray dispersive properties.

10. The subassembly as defined in claim 1 wherein each of said structures intersect said X-rays at different angles.

11. The subassembly as defined in claim 1 wherein each of said dispersive structures include an X-ray absorbing portion to prevent X-rays from being transmitted directly through said structures.

12. The subassembly as defined in claim 1 wherein said layer sets have a substantially equal fixed d spacing.

13. The subassembly as defined in claim 1 wherein said layer sets are formed to have a graded d spacing to increase the collected flux.

14. The subassembly as defined in claim 13 wherein said layer sets have a substantially equal fixed d spacing.

15. A converging beam X-ray monochromatizer subassembly (36 of FIG. 5) comprising a plurality of individual X-ray dispersive structures (18) having at least one surface with a plurality of layer sets (22) formed thereon, the layer sets (22) on each of the X-ray dispersive structures (18) being different and having substantially different X-ray dispersive properties, the individual X-ray dispersive structures (18) being arrayed about a circle (28) with the optical center of each individual X-ray dispersive structure (18) being on the circumference of the circle (29) and adapted for use with an X-ray point source (14) so that the tangent plane of X-rays (16) from the point source (14) at the optical center of each individual X-ray dispersive structure (18) lies on the circle (28) at a center of rotation (30), such that each structure (18) intersects the X-rays (16) at substantially different angles (theta-1, theta-2, theta-3) so as to reflect converging, reflected, monochromatized X-rays (16').

16. The subassembly as defined in claim 15 wherein said dispersive structures are substantially planar.

17. The subassembly as defined in claim 15 wherein said dispersive structures are substantially curved.

18. The subassembly as defined in claim 15 wherein said dispersive structures include an X-ray absorbing portion to prevent X-rays from being transmitted directly through said structures.

19. The subassembly as defined in claim 15 wherein said layer sets have substantially equal fixed d spacing.

20. The subassembly as defined in claim 15 wherein said layer sets are formed to have a graded d spacing to increase the collected flux.

21. An improved method for monochromatizing X-rays, comprising:
   interesecting the X-rays with a monochromatic X-ray subassembly including a center of rotation and a plurality of X-ray dispersive structures, each of said structures having at least one surface with a plurality of layer sets formed thereon, each said layer set including at least two layers, said layer sets having X-ray dispersive properties, aligning said plurality of structures to reflect X-rays directly by the X-ray dispersive structure to a focus so as to monochromatize and reflect said intersected X-rays;
   rotating said X-ray subassembly about the center of rotation while intersecting the X-rays so as to make the average irradiance more uniform; and detecting said reflected, monochromatized X-rays at the focus.

22. The method as defined in claim 21 including rotating said subassembly about a center of rotation while intersecting said X-rays to make the average irradiance distribution more uniform.

23. The method as defined in claim 21 including forming said structures with an optical center on a circle and rotating said subassembly about the center of the circle to enhance the detected image contrast.

24. A diverging beam X-ray monochromatizer subassembly (10) comprising a plurality of individual X-ray dispersive structures (18), the individual X-ray dispersive structures (18) having at least one surface with a plurality of layer sets (22) formed thereon, the layer sets (22) on each of the X-ray dispersive structures (18) being arrayed about a circle (28) with the optical center of each individual X-ray dispersive structure (18) being on the circumference of the circle (28) and adapted for use with an X-ray point source (14) so that the tangent plane of X-rays (16) from the point source (14) at the optical center of each individual X-ray dispersive structure (18) lies on the circle (28) at a center of rotation (30), such that each structure (18) intersects the X-rays (16) at substantially the same angle so as to reflect divergent, reflected, monochromatized X-rays (16') having a virtual source (34 of FIG. 3) different from the actual point source (14) on the circle (18).

25. An improved method for monochromatizing X-rays, comprising:

intersecting the X-rays with a monochromatic X-ray subassembly formed with an optical center on a circle and including a plurality of X-ray dispersive structures, each of said structures having at least one surface with a plurality of layer sets formed thereon, each said layer set including at least two layers, said layer sets having X-ray dispersive properties, aligning said plurality of structures to reflect X-rays directly by the X-ray dispersive structure to a focus so as to monochromatize and reflect said intersected X-rays and rotating the subassembly about the center of the circle to enhance the detected image contrast; and detecting said reflected, monochromatized X-rays at the focus.

26. An improved method for monochromatizing X-rays, comprising:

interesecting the X-rays with a monochromatic X-ray subassembly including a plurality of X-ray dispersive structures, each of said structures having at least one surface with a plurality of layer sets formed thereon, each said layer set including at least two layers, said layer sets having X-ray dispersive properties, aligning said plurality of structures to reflect X-rays directly by the X-ray dispersive structure to a focus so as to monochromatize and reflect said intersected X-rays, and including an X-ray absorbing portion to prevent X-rays from being transmitted through said structures; and detecting said reflected, monochromatized X-rays at the focus.

* * * * *